United States Patent
Yoon et al.

(10) Patent No.: US 8,031,611 B2
(45) Date of Patent: Oct. 4, 2011

(54) METHOD OF GENERATING IP TRAFFIC FLOW BASED ON A TIME BUCKET

(75) Inventors: Sang Sik Yoon, Gwangju (KR); Sang Wan Kim, Daejeon (KR); Dong Won Kang, Daejeon (KR); Tae Sang Choi, Daejeon (KR); Joon Kyung Lee, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 136 days.

(21) Appl. No.: 11/947,541

(22) Filed: Nov. 29, 2007

(65) Prior Publication Data
US 2008/0130498 A1 Jun. 5, 2008

(30) Foreign Application Priority Data

Dec. 1, 2006 (KR) .................. 10-2006-0120781
Jul. 27, 2007 (KR) .................. 10-2007-0075547

(51) Int. Cl.
*G01R 31/08* (2006.01)
(52) U.S. Cl. ................... 370/235.1; 370/230
(58) Field of Classification Search ........... 370/230, 370/235, 235.1
See application file for complete search history.

(56) References Cited

U.S. PATENT DOCUMENTS

| 7,193,968 | B1 * | 3/2007 | Kapoor et al. | 370/235 |
| 7,385,924 | B1 * | 6/2008 | Riddle | 370/235 |
| 7,412,510 | B2 * | 8/2008 | Schweitzer et al. | 709/224 |
| 2003/0226032 | A1 * | 12/2003 | Robert | 713/200 |
| 2004/0083347 | A1 * | 4/2004 | Parson | 711/165 |
| 2005/0117513 | A1 * | 6/2005 | Park et al. | 370/230 |
| 2005/0249125 | A1 | 11/2005 | Yoon et al. | |
| 2007/0019640 | A1 | 1/2007 | Thiede | |
| 2008/0095065 | A1 * | 4/2008 | Albrecht | 370/252 |

FOREIGN PATENT DOCUMENTS

| JP | 2001136204 | 5/2001 |
| JP | 2005236909 | 9/2005 |
| KR | 1020030028013 A | 4/2003 |
| KR | 1020030030372 A | 4/2003 |
| KR | 1020050052636 A | 6/2005 |

* cited by examiner

*Primary Examiner* — Derrick Ferris
*Assistant Examiner* — Angel Brockman

(57) ABSTRACT

A method of generating IP traffic flow based on a time bucket divides, in order to generate flows using all IP packets arriving in a preset time bucket, a previous time bucket flow table (PTBFT) and a current time bucket flow table (CTBFT) with reference to a current time when the flows are generated using IP packets collected from a high-speed line in a flow generating unit. Accordingly, the method allows real-time analysis of flows.

13 Claims, 6 Drawing Sheets

METHOD OF GENERATING IP TRAFFIC FLOW BASED ON A TIME BUCKET

CROSS-REFERENCE TO RELATED APPLICATIONS

This application claims the priority of Korean Patent Application No. 10-2007-75547, filed on Jul. 27, 2007 and Korean Patent Application No. 10-2006-0120781, filed on Dec. 1, 2006 in the Korean Intellectual Property Office, the disclosure of which is incorporated herein by reference.

BACKGROUND OF THE INVENTION

1. Field of the Invention

The present invention relates to a method of generating Internet Protocol (IP) flows, and more particularly, to a method of generating IP traffic flows based on a time bucket, which is configured to generate flows using all IP packets arriving in a predetermined time bucket and collected from a high-speed line.

This work was supported by the IT R&D program of MIC/IITA[Project number: 2006-S-065-02, Project Title: Development of High-Speed Wireline (10 Gbs, 2.5 Gbps) for Charging].

2. Description of the Related Art

The term "flow" being used in Internet generally can be defined as a set of IP packets having common characteristics, which are collected from traffic flowing on an Internet line. The traffic characteristic indicates a fixed value of an IP header and an L4 (transmission control protocol (TCP) or user datagram protocol (UDP)). The meaning of having common characteristics is that such fixed values of IP packets are the same. Accordingly, IP packets having the same fixed values are considered to have the same traffic characteristic and a flow is formed using those IP packets.

For example, a flow can be defined a set of IP packets having the same IP source address, IP destination address, protocol, IP source port number, and IP destination port number. Accordingly, such a flow includes general information on traffic flowing on the Internet line. Moreover, if additional information is added to the flow, information on all usage patterns and behaviors of traffic flowing on the Internet line can be collected and analyzed.

The information to be added to a flow may include the start time and the end time of a flow, the number of IP packets, the total amount of bytes, and an interface number. Moreover, information on IP packets forming a flow may be added. However, in the case where all information on each IP packet is transmitted, the amount of information is too much for a high-speed line. Accordingly, most flow measurement systems generate a flow using only general information of the flow, i.e., basic statistical information, terminate the flow, and transfer a terminated flow to an analysis system to analyze the information on the terminated flow.

To generate a flow by collecting traffic flowing on the Internet line, the following different timeout mechanisms are used to generate and terminate a flow using received IP packets. However, flows generated using the following timeout mechanisms include basic statistical information but do not include information on each IP packet.

The first timeout mechanism is a FIN timeout mechanism. In the FIN timeout mechanism, when a predetermined FIN timeout (basic time: 2 seconds) elapses after a last FIN or RST packet among IP packets of a predetermined flow arrives, a FIN timeout flow is generated. A flow measurement system terminates the FIN timeout flow and transfer a terminated FIN timeout flow.

The second timeout mechanism is an INACTIVE timeout mechanism. In the INACTIVE timeout mechanism, when a new IP packet does not arrive even after an INACTIVE timeout (basic time: 15 seconds) elapses after a last IP packet of a predetermined flow arrives, an INACTIVE timeout flow is generated and terminated, and the terminated INACTIVE timeout flow is transferred.

The third timeout mechanism is an ACTIVE timeout mechanism. In the ACTIVE timeout mechanism, when the flow continues for too long as IP packets continuously arrive during an ACTIVE timeout (basic time: 30 minutes) after a first IP packet of a predetermined flow arrives, an ACTIVE timeout flow is generated and terminated, and the terminated flow is transferred.

The fourth timeout mechanism is a MEMORY timeout mechanism. In the MEMORY timeout mechanism, when a new flow cannot be generated due to memory starvation of a flow measurement system, in the order of oldest first, an MEMORY timeout flow is generated and terminated, and the terminated flow is transferred.

However, in the case of using the above described timeout mechanisms, a flow is time-continuously generated, the generated flow is not transferred until much later (in the case of the ACTIVE timeout flow: 30 minutes) after traffic actually passes according to the time point at which the flow is terminated. Thus, an analysis system, which performs flow analysis based on a predetermined analysis period, must have an analysis period longer than an ACTIVE timeout value, and thus the analysis system must have an analysis period longer than about 1 hour. That is, due to non-real time generation and transfer of the flow, the result of analyzing flow information at a predetermined time can be known after a minimum 1 hour.

On the other hand, when flows are continuously generated regardless of an analysis period of an analysis system, it is difficult to analyze traffic statistical information and flows based on an analysis period. Since the continuously generated flows extend over a plurality of analysis periods, if the flows include general information but do not include information on all IP packets of the flows, traffic cannot be divided according to the analysis periods. Also, if the flows include information on all IP packets, the IP packets must be divided according to the analysis periods, thereby affecting performance of an analysis server.

In addition, flows generated in a previous analysis period cannot be analyzed until all flows generated in a current analysis period are transferred. This is because the flows generated in the previous analysis period include flows that extend over the previous and the current analysis periods. Thus, after all the flows extending over the previous and the current analysis periods are generated and transferred (i.e., after the current analysis period finishes), the flows generated in the previous analysis period can be analyzed.

For example, if an analysis period is 1 hour, after minimum 2 hours, an analysis result can be known at the time point at which flow analysis is completed. If the analysis period is shortened in order to solve the above described limitation, the ACTIVE timeout value of a flow measurement system must be shortened. Such a method has only a small effect that causes a actual long flow to be divided into a plurality of flows, but cannot solve the limitation. It is practically impossible to generate flows including information on each IP packet due to transmission bandwidth, CPU processing speed, speed of storage unit, storage capacity and so on in connection with the large amount of information.

Therefore, in order to the above described limitations, a flow generation unit is required, which generates flows without generating flows over a plurality of analysis periods by generating the flows using all IP packets within a predetermined analysis period based on a time bucket timeout flow generation mechanism.

Also, in order to the above described limitations, a unit is required, which is applicable to a flow measurement system for IP traffic flowing on an Internet high-speed line by implementing generation of a time bucket based flow, a FIN flow and an INACTIVE flow using micro-coding of a Micro Engine (ME) that is executed on network process.

SUMMARY OF THE INVENTION

According to an aspect of the present invention, there is provided a method of generating a flow by collecting IP packets from an IP line, including: checking a current time and determining whether a time bucket is changed with reference to the current time; determining whether the collected IP packets exist and receiving the collected IP packet when the collected IP packets exist; transferring to a flow transferring unit a previous time bucket flow (PTBF) to which the received IP packet belongs when the time bucket is changed, and deleting the PTBF in a previous time bucket flow table (PTBFT); and transferring an end time bucket flow (ETBF) through the flow transferring unit, when the PTBFT is empty after the deleting the PTBF.

According to another aspect of the present invention, there is provided a method of generating a flow by collecting IP packets from an IP line, including: checking a current time and determining whether a time bucket is changed with reference to the current time; determining whether the collected IP packets exist and receiving the collected IP packet when the collected IP packets exist; and updating a current time bucket flow table (CTBFT) using the received IP packet when the time bucket is not changed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
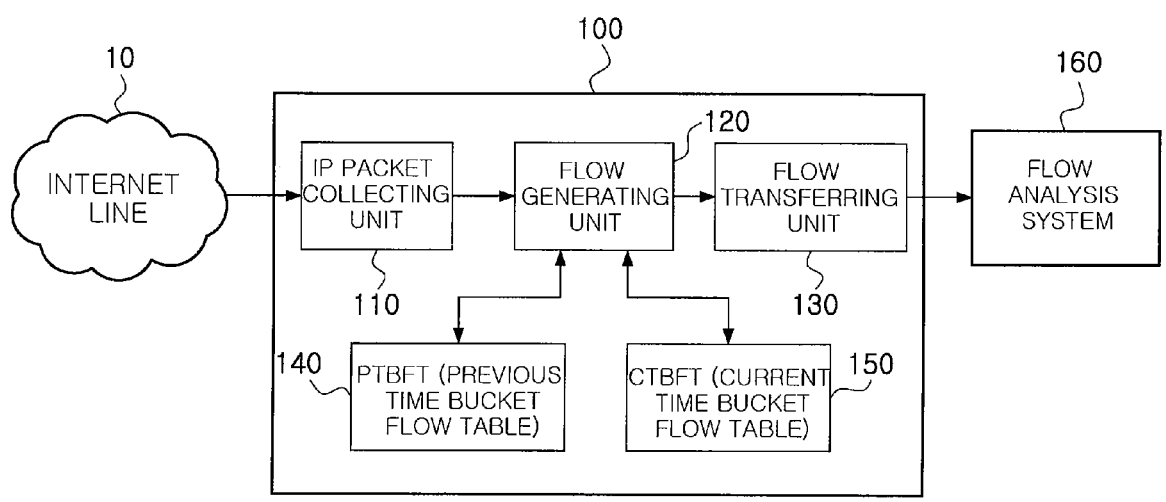
FIG. 1 illustrates a configuration of an IP traffic measurement system for generating a flow based on a time bucket according to the present invention.

Exemplary embodiments of the present invention will now be described in detail with reference to the accompanying drawings. The detailed description of well-known functions and elements will be omitted.

Throughout the accompanying drawings, like reference numerals denote like elements.

FIG. 1 illustrates a configuration of an IP traffic measurement system for generating a flow based on a time bucket according to the present invention.

Referring to FIG. 1, a flow measurement system 100 (that generates a flow based on a time bucket) collects IP packets from an Internet line 10 and generates a plurality of flows using the collected IP packets based on the time bucket. The flow measurement system 100 transfers the generated flows to a flow analysis system 160 for analyzing the generated flows.

The flow measurement system 100 generating flows based on the time bucket includes an IP packet collecting unit 110, a flow generating unit 120, and a flow transferring unit 130. The IP packet collecting unit 110 collects IP packets from the Internet line 10. The flow generating unit 120 generates flows based on the time bucket. The flow transferring unit 130 transfers the generated flows to the flow analysis system 160. In order to generate flows based on the time bucket, the flow generating unit 120 stores flows in a previous time bucket flow table (PTBFT) 140 and a current time bucket flow table (CTBFT) 150.

Specifically, the IP packet collecting unit 110 collects IP packets from a physical Internet line and stores the collected IP packets in an internal buffer. The collected IP packets are transferred to the flow generating unit 120 that generates a flow by grouping the collected IP packets respectively with IP packets having common characteristics.

IP packets collectable by the collecting unit 110 may include signal protocols and links of physical Internet high-speed lines of all network interfaces. For example, usable cables include an unshield twisted pair (UTP) cable, an optical cable. Physical signal protocols and speeds may include a Giga Ethernet, an asynchronous transfer mode (ATM), and optical carriers (OC)-12/48/192/758.

The flow generating unit 120 receives IP packets from the IP packet collecting unit 110, and generates a flow and terminates the flow using the PTBFT 140 and the CTBFT 150 that are determined with reference to a current time. The time bucket indicates a predetermined time period for generating a flow. Thus, the size of the time bucket can be set to various values. In the present invention, in order to overcome a limitation related to non real-time analysis, a flow is generated by an analysis period that is set in minutes. In some cases, the size of the time bucket may be set to various values.

The PTBFT 140 and the CTBFT 150 must be made in order that the flow generating unit 120 may generate flows based on the time bucket. The PTBFT 140 stores temporary flows generated in a previous time bucket (PTB) determined with reference to a current time. The CTBFT 150 stores temporary flows generated in a current time bucket (CTB) including the current time. For example, in the case where the size of a time bucket is set to 5 minutes, if a current time is 12:08, a time bucket of 12:00 to 12:05 is a PTB and a flow generated in the time period of 12:00 to 12:05 is stored in a PTBFT determined with reference to the current time. On the other hand, a time bucket of 12:05 to 12:10 becomes a CTB and a flow generated in the time period of 12:05 to 12:10 is stored in a CTBFT determined with reference to the current time. Thus, a PTB and a CTB are continuously changed according to a current time.

Flows generated by the flow generating unit 120 are transferred to the flow analysis system 160 by the flow transferring unit 130, and the flow analysis system 160 analyzes the transferred flows according to an analysis period. The analysis system 160 may analyze the transferred flows according to an analysis period, the characteristics of the flows and so on.

Figure 2:
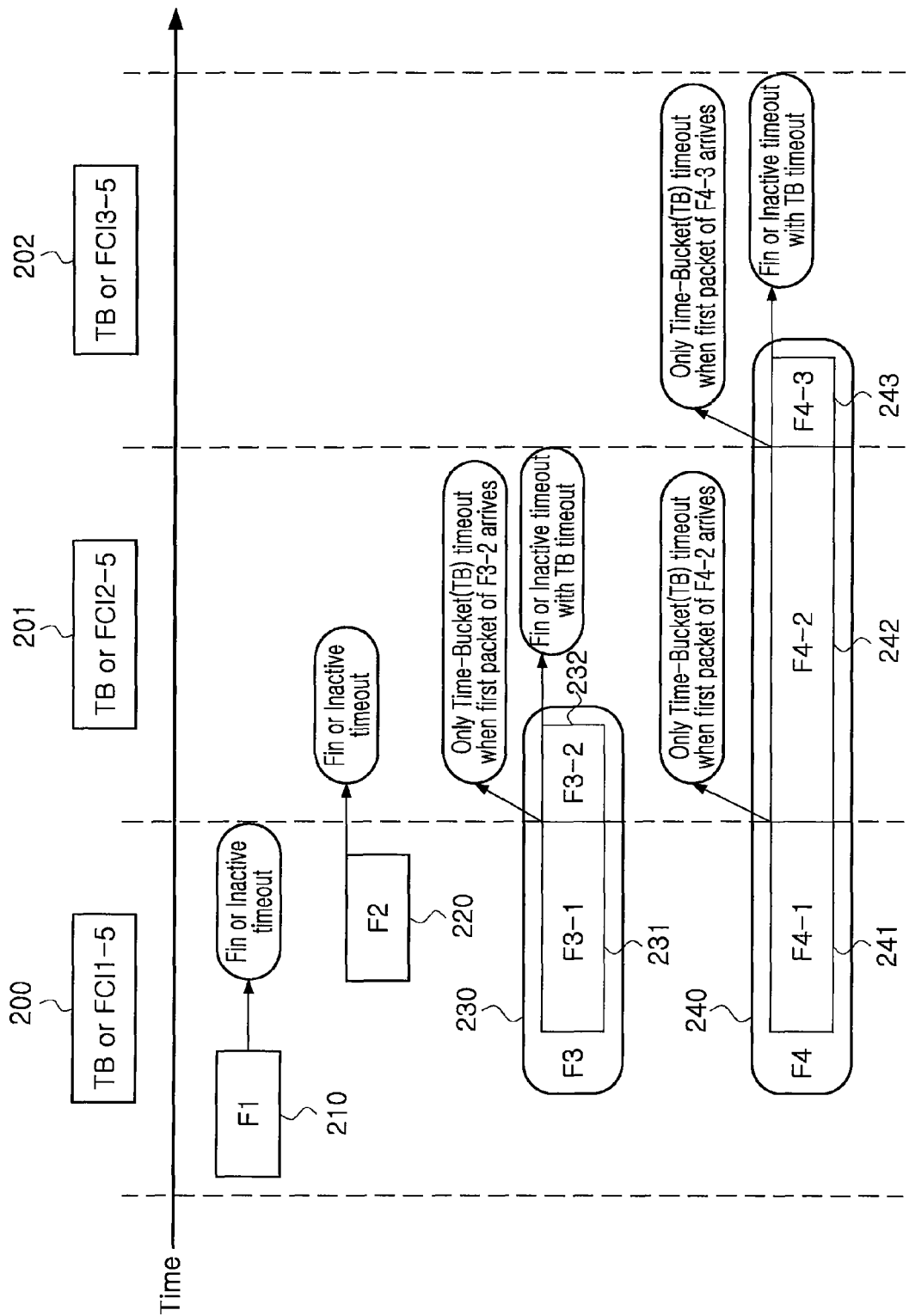
FIG. 2 illustrates various kinds of flows generated by a method of generating an IP traffic flow based on a time bucket according to the present invention.

FIG. 2 illustrates various kinds of flows generated by a method of generating an IP traffic flow based on a time bucket according to the present invention.

Flows generated by the present invention may be classified into three kinds, i.e., time bucket based flows, FIN flows, and INACTIVE flows. The classification of the generated flows is performed according to a time point at which each flow is terminated.

Referring to FIG. 2, generated flows are separated by three time buckets 200, 201, and 202.

In an FCI1-5 time bucket (TB) 200 among the three time buckets, an F1 210, an F2 220, an F3-1 231 and an F4-1 241 are generated and terminated. The F1 210 and the F2 220 is terminated in a FIN timeout or an INACTIVE timeout. The F3-1 231 and the F4-1 241 are generated and terminated in a time bucket timeout.

In an FCI2-5 TB 201, a F3-2 232 is terminated in the FIN timeout or the INACTIVE timeout. A F4-2 242 is generated and terminated in the time bucket timeout.

In an FCI3-5 TB 202, a F4-3 243 is terminated in the FIN timeout or the INACTIVE timeout.

On the other hand, in an aspect of generation and termination, there are a F1 210, a F2 220, a F3 230, and a F4 240.

With respect to the F1 210, the generation of the F1 210 is initiated in a time bucket and terminated in the same time bucket in the FIN timeout or the INACTIVE timeout. With respect to the F2 220, the start point and end point of the F2 220 exist in a time bucket, but a time point (at which the generation of the F2 220 is terminated in the FIN timeout or the INACTIVE timeout) exists in a next time bucket. With respect to the F3 230, the F3 230 extends over a current time bucket (FCI1-5 200) and a next time bucket (FCI2-5 201), so that the F3 230 is divided into two flows. One of the two flows is a F3-1 231, the generation of which is terminated at a time point at which a first packet arrives in the next time bucket. The other of the two flows is a F3-2 232, the generation of which is terminated in the next time bucket in the FIN timeout or the INACTIVE timeout.

With respect to the F4 240, the F4 240 extends over three time buckets. The F4 240 is divided into three flows, i.e., a F4-1 241, a F4-2 242 and F4-3 243 as illustrated in FIG. 2. The generation of the F4-1 241 is terminated at a time point at which a first packet arrives in the FCI2-5 201. The generation of the F4-2 242 is terminated at a time point at which a first packet arrives in the FCI3-5 202. The generation of the F4-3 243 is terminated in the FCI3-5 202 in the FIN or the INACTIVE timeout. The basic unit of the time bucket according to the present invention is the minute and the time bucket has a time range of from 1 to 60 minutes. However, the basic unit and the time range of the time bucket are not limited to the above-mentioned examples.

Figure 3A:
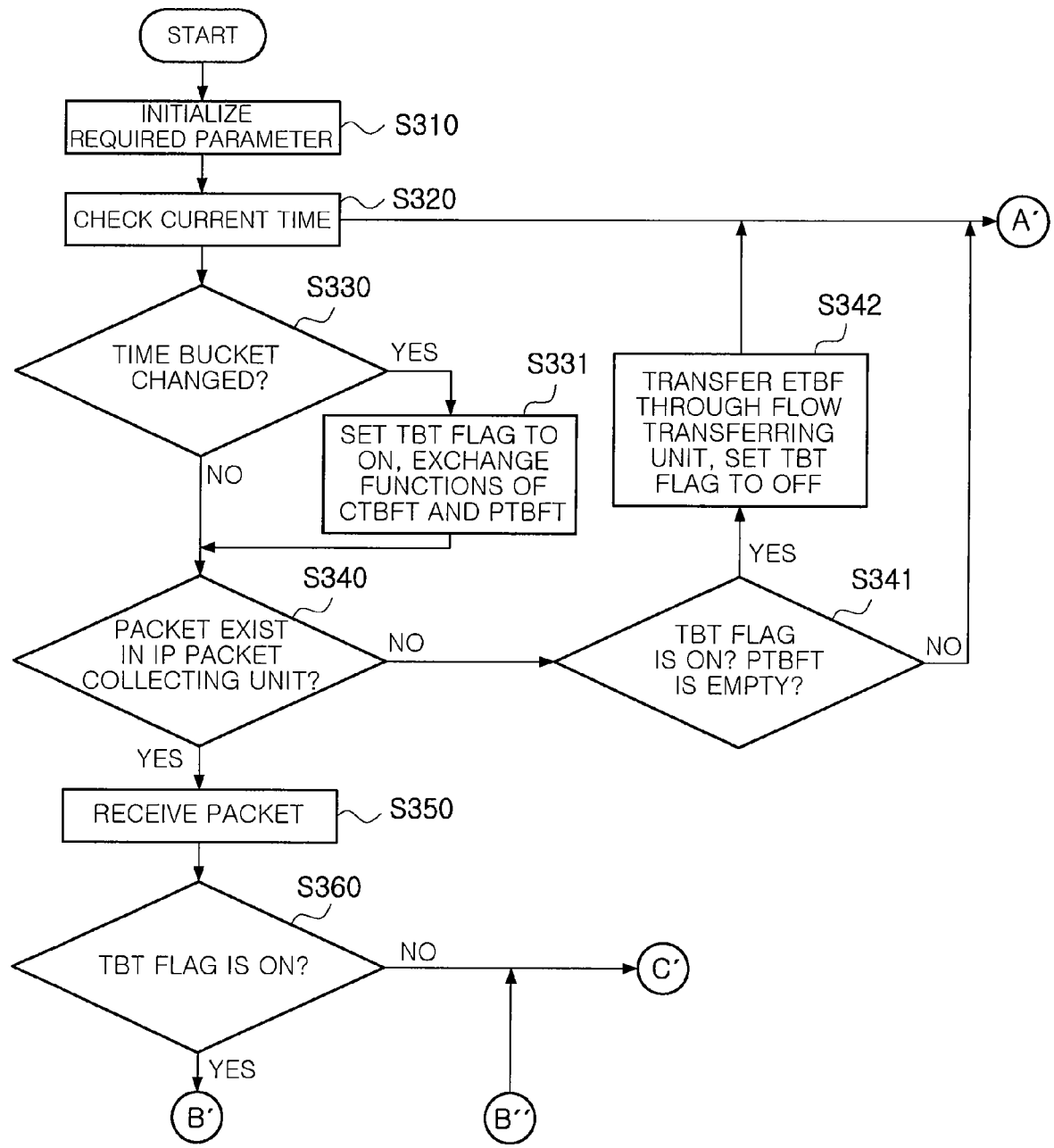
FIG. 3A is a flowchart illustrating a method of generation an IP traffic flow based on a time bucket according to the present invention.
Figure 3B:
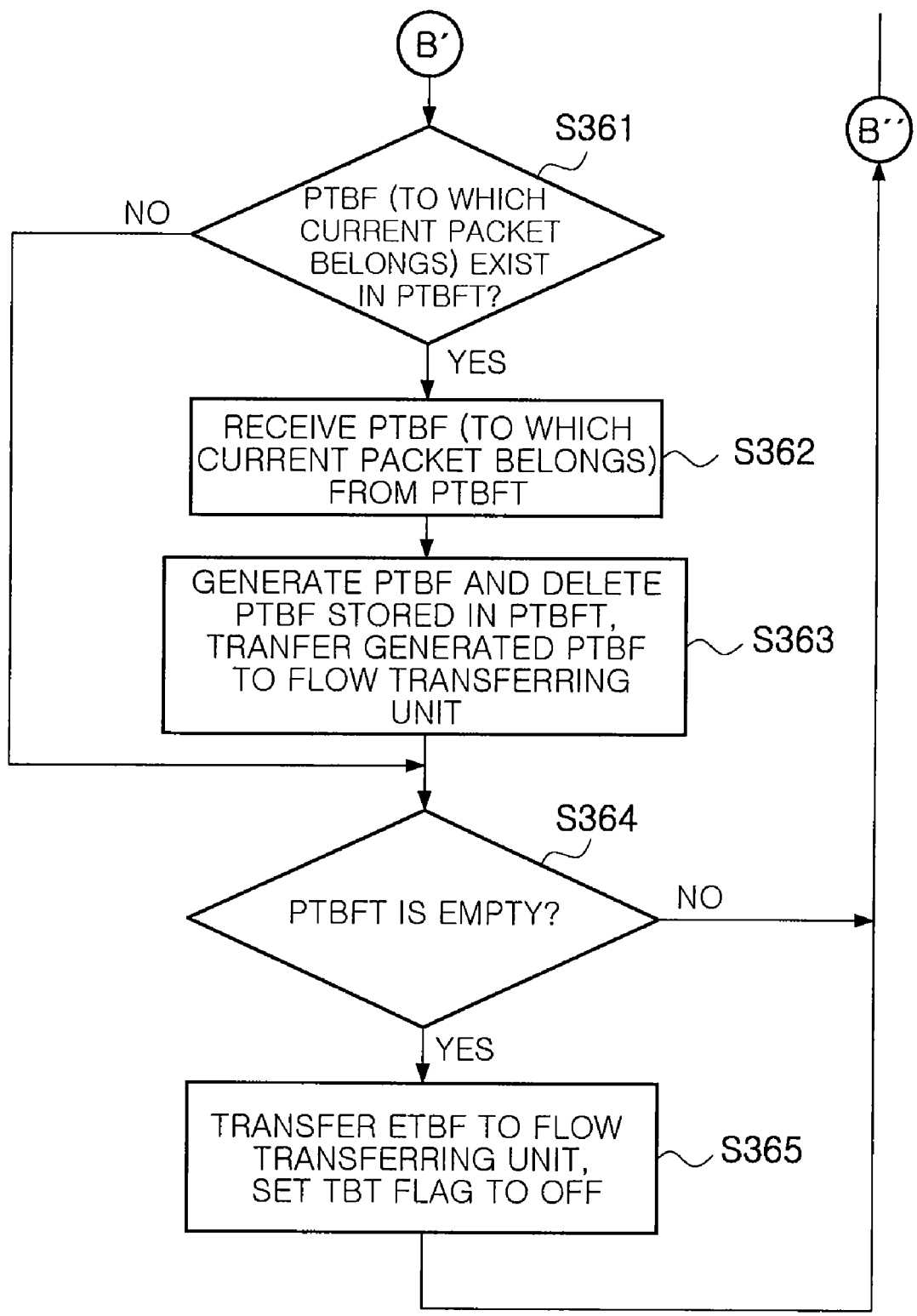
FIG. 3B is a flowchart illustrating a procedure of from B' to B" of FIG. 3A.
Figure 3C:
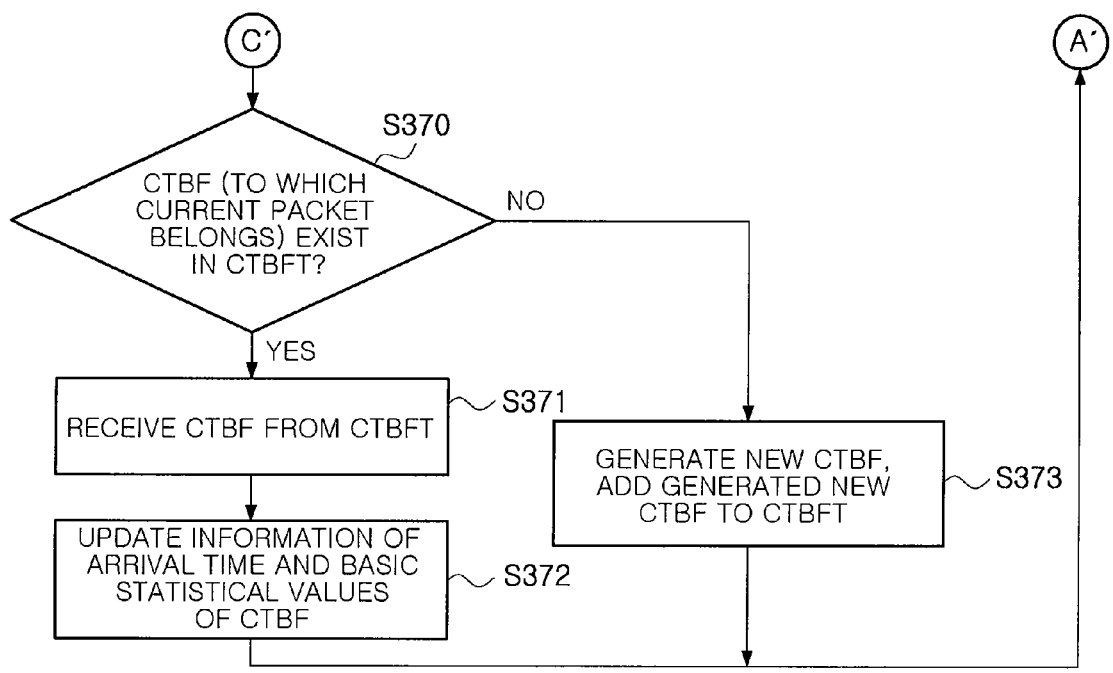
FIG. 3c is a flowchart illustrating a procedure of from C' to A' of FIG. 3A.

FIG. 3A is a flowchart illustrating a method of generation an IP traffic flow based on a time bucket according to the present invention. FIG. 3A is described together with FIGS. 3B and 3C.

In operation S310, firstly, required parameters are initialized in order to generate an IP traffic flow based on a time bucket. The required parameters include a time bucket (TB), a time bucket timeout (TBT) flag, a previous time bucket flow table (PTBFT), and a current time bucket flow table).

In operation S320, after the initialization of the required parameters, a current time is checked. Since a PTB and a CTB for generating a flow based on a time bucket are determined with reference to a current time, the current time is first checked.

In operation S330, it is determined whether the checked current time passes a CTB. For example, if the CTB is from 12:00 to 12:05 and the current time is 12:04, the CTB is not changed. While, when the current time is 12:06, the CTB is changed to a new time period of from 12:05 to 12:10.

In operation S331, when the current time passes the CTB and the CTB is changed, a TBT flag is set to ON and the function of a CTBFT and the function of a PTBFT are exchanged. That is, an empty PTBFT is converted into a new CTBFT and a CTBFT is converted into a new PTBFT.

When a CTBFT 150 and a PTBFT 140 are determined with reference to the checked current time, in operation S340, it is determined whether packets exist in the IP packet collecting unit 110. In operation 350 when packets exist, one IP packet is transferred.

In operation S341, when packets do not exist in the IP packet collecting unit 110, it is determined whether the TBT flag is ON and the PTBFT 104 is empty. In operation S342, when the TBT flag is ON and the PTBFT 104 is empty, an end of time bucket flow (ETBF) is generated and the generated ETBF is transferred to the flow generating unit 130 and then the TBT flag is set to OFF. Thereafter, this procedure returns to the operation S320 of checking a current time. On the other hand, when the TBT flag is ON and the PTBFT 104 is not empty, this procedure returns to the operation S320 of checking a current time.

Hereinafter, the ETBF is described in detail. The ETBF is a particular flow through which a last flow generated in a predetermined time bucket can be recognized. That is, the ETBF is not a flow consisting of packets, but a meta flow which indicates that generation of flows is completed in the predetermined time bucket. Until a PTBFT becomes empty after a time bucket is changed into a new time bucket, a previous time bucket flow and a current time bucket flow are generated simultaneously and transferred. After a last flow that makes the PTBFT become empty is generated, an ETBF on the previous time bucket is generated simultaneously and is transferred to the flow transferring unit 130. The ETBF may include basic statistical traffic information (e.g., average bps, pps and fps, the amount of total bytes, the number of packets and flows) about the predetermined time bucket.

In operation 350, when packets exist in the packet collecting unit 110, one packet is transferred. In operation S360, it is determined whether a TBT flag is ON. In operation S361, when the TBT flag is ON, it is determined whether a PTBF (that includes a packet having the same characteristic as the transferred packet) exists in the PTBFT. In operation S362, when the PTBF having the same characteristic exists, the PTBF is transferred. In operation S363, the transferred PTBF is transferred to the flow transferring unit 130 and the PTBF stored in the PTBFT is deleted.

In operation S364, when packets do not exist in the packet collecting unit 110 or a PTBF stored in the PTBFT is deleted, it is determined whether the PTBFT is empty with reference to a current time.

In operation S365, when the PTBFT is empty, an ETBF is generated and transferred to the flow transferring unit 130 and then the TBT flag is set to OFF.

In operation S370, when the PTBFT is not empty or an ETBF is generated and transferred, it is determined whether a CTBF (that includes a packet having the same characteristic as the transferred packet) exists in the CTBFT. On the other hand, when packets exist in the packet collecting unit 110 and one packet is transferred in the operation S350 and also the TBT flag is not ON, it is also determined whether a CTBF (that includes a packet having the same characteristic as the transferred packet) exists in the CTBFT in the operation S370.

In operation S371, when the CTBF including a packet having the same characteristic exists in the CTBFT 150, the CTBF is transferred. In operation S372, the arrival time and basic statistical values of the CTBF are updated using the transferred packet.

In operation S373, on the other hand, when the CTBF including a packet having the same characteristic does not exist in the CTBFT 150, a new CTBF is generated and the generated new CTBF is added to the CTBFT 150.

When information on the CTBF is updated or a new CTBF is added, this procedure returns to the operation S320 of checking a current time.

Figure 4:
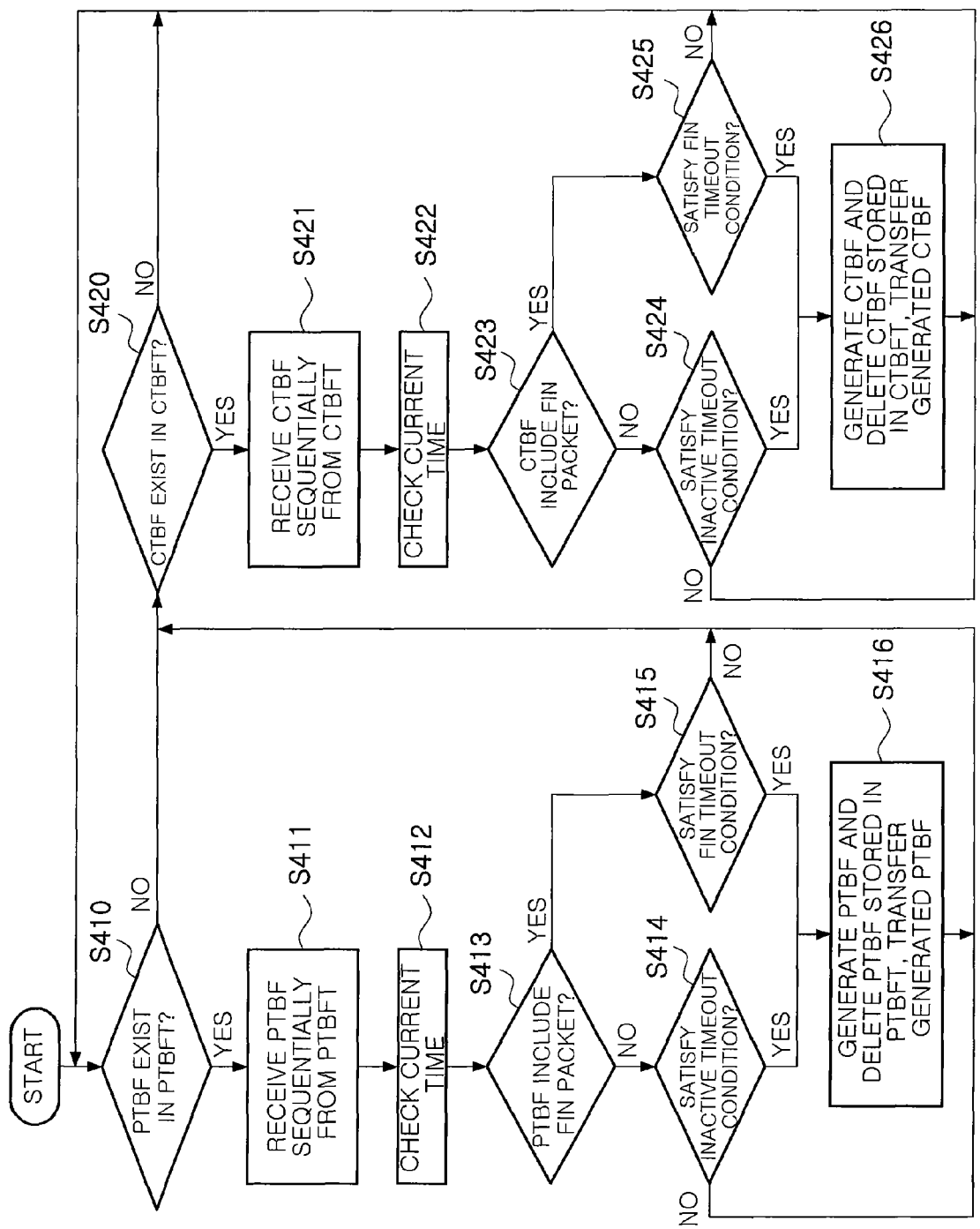
FIG. 4 is a flowchart illustrating a method of generating a FIN timeout flow and an INACTIVE timeout flow based on a time bucket according to the present invention.

FIG. 4 is a flowchart illustrating a method of generating a FIN timeout flow and an INACTIVE timeout flow based on a time bucket according to the present invention.

For flow generation/termination, in consideration of a time bucket, a FIN timeout flow generation method and an INACTIVE timeout flow generation method may be used together with the flow generation method based on the time bucket according to the present invention. When a measurement system employs two methods concurrently, lock function must be used in order to ensure data integrity of temporary flows in a PTBFT and a CTBFT.

First, in operation S 410, it is determined whether previous time bucket flows (PTBFs) exist in a PTBFT. In operation S411, when PTBFs exist, a PTBF is transferred from the PTBFT sequentially. On the other hand, in operation S420, when PTBFs do not exist, it is determined whether current time bucket flows (CTBFs) exist in a CTBFT.

In operation S412, after a PTBF is transferred, a current time is checked. In operation S413, it is determined whether the transferred PTBF includes a FIN packet.

In operation S415, when the transferred PTBF includes the FIN packet, it is determined whether a FIN timeout condition is satisfied. In operation S414, when the transferred PTBF does not include the FIN packet, it is determined whether an INACTIVE timeout condition is satisfied. In operation S416, when the FIN timeout condition or the INACTIVE timeout condition is satisfied, a PTBF is generated and transferred and then the PTBF of the PTBFT is deleted.

In the operation S420, when the FIN timeout condition or the INACTIVE timeout condition is not satisfied, it is determined whether current time bucket flows (CTBFS) exist in the CTBFT.

In operation S421, when CTBFs exist in the CTBFT, a CTBF is transferred from the CTBFT sequentially. When CTBFs do not exist, this procedure returns to the operation S410 of determining whether PTBFs exist.

In operation S422, after the CTBF is transferred, a current time is checked.

In operation S423, it is determined whether the transferred CTBF includes a FIN packet.

In operation S425, when the transferred CTBF includes the FIN packet, it is determined whether a FIN timeout condition is satisfied. In operation S424, when the transferred CTBF does not include the FIN packet, it is determined whether an INACTIVE timeout condition is satisfied. In operation S426, when the FIN timeout condition or the INACTIVE timeout condition is satisfied, a CTBF is generated and transferred and then the CTBF of the CTBFT is deleted.

When the FIN timeout condition or the INACTIVE timeout condition is not satisfied, it is determined whether PTBFs exist in the PTBFT in the operation S410.

According to the present invention as described above, the IP traffic flow generation method based on the time bucket generates flows using all packets arriving in a predetermined time bucket time period, so that the analysis system based on an analysis period can perform more precise analysis. Thus, the exact information on IP traffic flows within an analysis period can be provided and it can be prevented that an analysis start time is delayed to the time point at which a next analysis period finishes because of flows that extend over a plurality of analysis periods.

The IP traffic flow generation method based on the time bucket according to the present invention can overcome non-real time analysis occurred in a related art ACTIVE timeout flow because the analysis period can be set to minutes, and can be used with the related art FIN or INACTIVE timeout methods.

The IP traffic flow generation method based on the time bucket according to the present invention can be applicable to a flow measurement system for IP traffic flowing on an Internet high-speed line by implementing generation of a time bucket based flow, a FIN flow and an INACTIVE flow using micro-coding of a Micro Engine (ME) that is executed on network process.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of generating an IP traffic flow on a time-bucket basis by collecting IP packets from an IP line, the method comprising:
    performing a first operation in which a current time is checked and it is determined whether a time bucket has been changed with reference to the current time;
    performing a second operation in which it is determined whether a collected IP packet exists in a IP packet collecting unit, and the collected IP packet is fetched from the IP packet collecting unit if the collected IP packet exists;
    performing a third operation in which a previous time bucket flow table (PTBFT) is processed when it is determined that the time bucket has been changed and a time bucket change state value has been set, wherein the PTBFT stores temporary traffic flows generated in a previous time bucket (PTB) determined with reference to the current time; and
    performing a fourth operation in which a current time bucket flow table (CTBFT) is processed when the time bucket change state value has not been set, wherein the CTBFT stores temporary traffic flows generated in a current time bucket (CTB) including the current time.

2. The method of claim 1, wherein the performing of the first operation comprises performing an operation in which when it is determined that the time bucket has been changed, the time bucket change state value is set, and the PTBFT and the CTBFT are simultaneously converted into a CTBFT and a PTBFT, respectively.

3. The method of claim 1, wherein the performing of the second operation comprises performing an operation in which, when the collected packet does not exist, if the time bucket change value has been set and the PTBFT is empty, an end time bucket flow (ETBF) is transferred to a flow transferring unit, the time bucket change state value is released, and then a process flow goes back to the first operation, and if otherwise, the process flow goes directly back to the first operation.

4. The method of claim 1, wherein the performing of the third operation comprises performing an operation in which it is determined whether a previous time bucket flow (PTBF) to which the fetched IP packet belongs exists in the PTBFT, and, when the PTBF exists in the PTBFT, the PTBF is fetched from the PTBFT to be removed from the PTBFT and then transferred to a flow transferring unit.

5. The method of claim 4, further comprising performing an operation in which it is determined whether the PTBFT is empty, and when the PTBFT is empty, an end time bucket flow (ETBF) is transferred to the flow transferring unit, the time bucket change state value is released, and a process flow goes to the fourth operation.

6. The method of claim 1, wherein the performing of the fourth operation comprises performing an operation in which it is determined whether a current time bucket flow (CTBF) to which the fetched IP packet belongs exists in the CTBFT, and when the CTBF exists in the CTBFT, the CTBF is fetched from the CTBFT, and an arrival time of the CTBF and a basic statistical value thereof are updated.

7. The method of claim 6, further comprising performing an operation in which, when the CTBF to which the fetched IP packet belongs does not exist in the CTBFT, another new CTBF is generated and added to the CTBFT, and a process flow goes back to the first operation.

8. A method of generating an IP flow on a time-bucket basis by collecting IP packets from an IP line, the method comprising:
performing a first operation in which it is determined whether a previous time bucket flow (PTBF) exists in a previous time bucket flow table (PTBFT), and, when the PTBF exists in the PTBFT, a next PTBF is sequentially fetched from the PTBFT, a current time is checked, and it is determined whether the fetched PTBF satisfies an INACTIVE timeout condition or a FIN timeout condition, wherein the PTBFT stores temporary traffic flows generated in a previous time bucket (PTB) determined with reference to the current time; and
performing a second operation in which, when the PTBF does not exist in the PTBFT, a next current time bucket flow (CTBF) is sequentially fetched from a current time bucket flow table (CTBFT), a current time is checked, and it is determined whether the fetched CTBF satisfies an INACTIVE timeout condition or a FIN timeout condition, wherein the CTBFT stores temporary traffic flows generated in a current time bucket (CTB) including the current time.

9. The method of claim 8, wherein the performing of the first operation comprises an operation in which, when the fetched PTBF satisfies the INACTIVE timeout condition or the FIN timeout condition, another new PTBF is generated and transferred through a flow transferring unit, and the fetched PTBF is deleted from the PTBFT.

10. The method of claim 8, wherein the performing of the second operation comprises an operation in which, when the fetched CTBF satisfies the INACTIVE timeout condition or the FIN timeout condition, another new CTBF is generated and transferred through a flow transferring unit, and the fetched CTBF is deleted from the CTBFT.

11. A method of generating an IP traffic flow on a time-bucket basis, the method comprising:
performing a first process comprising:
performing a first operation in which a current time is checked and it is determined whether a time bucket has been changed with reference to the current time;
performing a second operation in which it is determined whether a collected IP packet exists in a IP packet collecting unit, and the collected IP packet is fetched from the IP packet collecting unit when the collected IP packet exists;
performing a third operation in which a previous time bucket flow table (PTBFT) is processed when it is determined that the time bucket has been changed and a time bucket change state value has been set, wherein the PTBFT stores temporary traffic flows generated in a previous time bucket (PTB) determined with reference to the current time; and
performing a fourth operation in which a current time bucket flow table (CTBFT) is processed when the time bucket change state value has not been set, wherein the CTBFT stores temporary traffic flows generated in a current time bucket (CTB) including the current time; and
performing a second process comprising:
performing a fifth operation in which it is determined whether a previous time bucket flow (PTBF) exists in the PTBFT, and, when the PTBF exists in the PTBFT, a next PTBF is sequentially fetched from the PTBFT, a current time is checked, and it is determined whether the fetched PTBF satisfies an INACTIVE timeout condition or a FIN timeout condition; and
performing a sixth operation in which, when the PTBF does not exist in the PTBFT, a next current time bucket flow (CTBF) is sequentially fetched from the current time bucket flow table (CTBFT), a current time is checked, and it is determined whether the fetched CTBF satisfies an INACTIVE timeout condition or a FIN timeout condition,
wherein the first and the second processes are concurrently performed to ensure integrity regarding temporary flow information within the PTBFT and the CTBFT.

12. The method of claim 11, wherein the performing of the third operation comprises determining whether a PTBF to which the fetched IP packet belongs exists in the PTBFT, and, when the PTBF exists in the PTBFT, fetching the PTBF from the PTBFT to be removed from the PTBFT and then transferring the fetched PTBF to a flow transferring unit.

13. The method of claim 11, wherein the performing of the fourth operation comprises determining whether a CTBF to which the fetched IP packet belongs exists in the CTBFT, and when the CTBF exists in the CTBFT, fetching the CTBF from the CTBFT, and updating an arrival time of the CTBF and a basic statistical value thereof.

* * * * *